United States Patent [19]
Kagan et al.

[11] Patent Number: 5,874,146
[45] Date of Patent: Feb. 23, 1999

[54] PERFORMANCE OF VIBRATION WELDED THERMOPLASTIC JOINTS

[75] Inventors: Valeriy Kagan, Morris Plains; Caroline Bednarczyk, Warren; Siu-Ching Lui, Watchung, all of N.J.; Gregory R. Smith, Export, Pa.

[73] Assignee: AlliedSignal Inc., Morris Township, N.J.

[21] Appl. No.: 742,638

[22] Filed: Nov. 1, 1996

Related U.S. Application Data

[60] Provisional application No. 60/006,334, Nov. 8, 1995.

[51] Int. Cl.⁶ ............................................. B32B 3/00
[52] U.S. Cl. .................. 428/57; 156/72.3; 156/73.1; 156/73.2; 156/73.4; 156/73.5; 156/73.6; 264/257; 264/445; 428/58; 428/60; 428/61; 428/62; 428/86; 428/105; 428/107; 428/109; 428/110; 428/111; 428/213
[58] Field of Search ................................ 428/57, 58, 60, 428/61, 62, 105, 107, 109, 110, 111, 213, 86; 264/257, 445; 156/73.1, 73.4, 73.5, 73.2, 72.3, 73.6

[56] References Cited

U.S. PATENT DOCUMENTS

| | | | |
|---|---|---|---|
| 2,991,208 | 7/1961 | Steiger | 428/88 |
| 3,058,513 | 10/1962 | Schaub et al. | 156/502 |
| 3,405,024 | 10/1968 | Attwood et al. | 156/73 |
| 3,647,599 | 3/1972 | Gardner | 156/502 |
| 3,920,504 | 11/1975 | Shoh et al. | 156/580 |
| 4,075,046 | 2/1978 | MacDonald | 156/73.1 |
| 4,086,122 | 4/1978 | Bouyoucos et al. | 156/556 |
| 4,190,093 | 2/1980 | Kearney et al. | 164/34 |
| 4,252,587 | 2/1981 | Harden et al. | 156/73.5 |
| 4,462,849 | 7/1984 | MacLaughlin et al. | 156/73.5 |
| 4,514,242 | 4/1985 | MacLaughlin et al. | 156/73.5 |
| 4,614,292 | 9/1986 | Polansky et al. | 228/1.1 |
| 4,618,516 | 10/1986 | Sager | 428/35 |
| 4,715,911 | 12/1987 | Johansson et al. | 156/69 |
| 4,844,320 | 7/1989 | Stokes et al. | 228/102 |
| 4,919,987 | 4/1990 | Manner | 428/60 |
| 5,160,393 | 11/1992 | Snyder | 156/73.5 |
| 5,277,744 | 1/1994 | Snyder | 156/580 |
| 5,378,951 | 1/1995 | Snyder | 310/17 |
| 5,633,063 | 5/1997 | Lause | 428/86 |

FOREIGN PATENT DOCUMENTS

| | | |
|---|---|---|
| 0 159 169 | 10/1985 | European Pat. Off. . |
| 2 455 502 | 11/1980 | France . |
| 32 42 478 | 5/1994 | Germany . |
| 60 239224 | 4/1986 | Japan . |
| 7 186 283 | 7/1995 | Japan . |
| 829442 | 5/1981 | Russian Federation . |
| 1 488 546 | 10/1977 | United Kingdom . |
| 2 061 183 | 5/1997 | United Kingdom . |

OTHER PUBLICATIONS

Welding Production, vol. 29, No. 1, Jan. 1982, Cambridge GB. pp. 5–6, E.I Kulic and R.F. Lokshin, "Friction Welding of Plastics" pp. 5 and 6.

Watson, Joint Plastics in Production, 1988, pp. 73 and 76.

Kunststoffe, vole 84, No. 10 New Pathways For Vibration Welding, p. 1464.

Welding and Metal Fabrication, vol. 57, No. 4, May 1989 Linear Vibration Welding of Non Metallic Components, pp. 152, 153 and 154.

Plastverabeiter, vol. 45, No. 1 pp. 21–22 Jan. 1994 "Vibrationsschweissen Von Polyamid 66".

Plastverabeiter, vol. 44, No. 6, Jun. 1, 1993 pp. 26–28, 30, 32–33 "Vergleichende Untersuchung Beim Schweissen Von Glasfaserverstarktem Pes".

Froment, Vibration Welding Nylon 6 and Nylon 66—A Comparative Study, Antec '95 pp. 1285–1288.

Kagan et al, "The Optimized Performance of Linear Vibration Welded Nylon 6 and Nylon 66 Butt Joints", Plastics-–Racing into the Future, Proceedings of the SPE 54th Annual Technical Conference and Exhibits.

Potente et al, "The Vibration Welding of Polyamide 66", Journal of Thermoplastic Composite Materials, vol. 6 –Jan. 1993, pp. 2–17.

Kagan et al., "Optimizing the Vibration Welding of Glass-–Reinforced Nylon Joints", Plastics Engineering, Sep. 1996.

Norrey, "Vibration Welding Nylons: A Comparative Study of Vibration–Welding Nylon 6 and Nylon 66", Engineering Design.

Matsco, "Multishell Technology for Plastic–Part Manufacture", Proceedings of Structural Plastics '95. Technical Conference and New Product Design Competition, Sponsored by the Structural Plastics Division of the Society of the Plastics Industry, Inc. Apr. 2–5, 1995.

*Primary Examiner*—Nasser Ahmad
*Attorney, Agent, or Firm*—Roger H. Criss; Colleen D. Szuch

[57] ABSTRACT

The invention provides an improved method of vibration welding of thermoplastic joints. Such welding is conducted by vibrating two fiber reinforced thermoplastic parts under pressure along their common interface to generate frictional heat to melt and fuse their surfaces together. Fibers from at least one surface penetrate both into the weld and into the other surface. As a result, the welded, fiber reinforced thermoplastic surfaces have increased tensile strength than heretofore achievable. Vibration welds of reinforced thermoplastic surfaces according to this invention achieve a maximum tensile strength as high as about 120% of a weld formed by the unreinforced surfaces of corresponding thermoplastic materials.

29 Claims, No Drawings

PERFORMANCE OF VIBRATION WELDED THERMOPLASTIC JOINTS

CROSS REFERENCE TO RELATED APPLICATION

This application claims the benefit of U.S. provisional patent application Ser. No. 60/006,334 filed Nov. 8, 1996 which is incorporated herein by reference.

BACKGROUND OF THE INVENTION

The present invention relates to vibration welding or more particularly to vibration welding of thermoplastic joints.

The ongoing demand to use thermoplastics to replace metals in automotive vehicle applications such as air induction systems has increased in recent years. It is estimated that by the year 2010, 21.4 million air intake manifold components will be produced using welding techniques. This invention concerns an improved method of vibration welding thermoplastic joints, and the vibration welded articles produced by the method. Vibration welding of thermoplastics such as nylon 6 and nylon 66 is well known in the art. See V. K. Stokes, "Vibration Welding of Thermoplastics, Part I: Phenomenology of the Welding Process", *Polymer Engineering and Science*, 28, 718 (1988); V. K. Stokes, "Vibration Welding of Thermoplastics, Part II: Analysis of the Welding Process", *Polymer Engineering and Science*, 28, 728 (1988); V. K. Stokes, "Vibration Welding of Thermoplastics, Part III: Strength of Polycarbonate Butt Welds", *Polymer Engineering and Science*, 28, 989 (1988); V. K. Stokes, "Vibration Welding of Thermoplastics, Part IV: Strengths of Poly(Butylene Terephthalate), Polyetherimide, and Modified Polyphenylene Oxide Butt Welds", *Polymer Engineering and Science*, 28, 998 (1988) and C. B. Bucknall, et al, "Hot Plate Welding of Plastics: Factors Affecting Weld Strength", *Polymer Engineering and Science*, 20, 432 (1980).

Vibration welding may be conducted by vibrating two parts under pressure along their common interface to generate frictional heat, and thereby melting and fusing their surfaces together. Vibration welding is a quick and inexpensive way to join irregularly shaped parts of various sizes. In the past, vibration welding has been used in low load-bearing applications. In automobile underhood applications such as air intake manifolds, air filter housings, and resonators, the expanded use of engineered plastics would be desirable to achieve savings and weight and cost. However, heretofore it has not been possible to achieve adequate weld strengths for such uses. Welding results are extremely sensitive to parameter uniformity and slight variations in them can result in significant changes in weld quality. Vibration welding parameters of pressure, frequency, amplitude, oscillation (welding) time, hold time and weld thickness all affect tensile strength of welds. It is an object of the present invention to provide a method for vibration welding fiber reinforced thermoplastic surfaces to provide welds having greater tensile strengths than have been heretofore achievable.

U.S. Pat. No. 4,844,320 teaches that weld strength are not affected by weld amplitude or weld time above a certain level. In conventional vibration welding, welds are formed at a vibration amplitude of 0.03 to 0.70 inch. In contrast we have found that weld amplitude and weld time are extraordinarily important criteria for increasing weld strength. The vibration welding of this invention uses a vibration amplitude of at least about 0.075 inch. It has been determined that conventional vibration welds of reinforced thermoplastic surfaces achieve a maximum tensile strength of approximately 80% of a weld formed by the unreinforced surfaces of corresponding thermoplastic materials. For glass fiber reinforced thermoplastics, this lowered tensile strength is attributed to a change in the glass fiber orientation at the welded joint. According to this invention, vibration welds of reinforced thermoplastic surfaces achieve a maximum tensile strength of as high as about 120% of a weld formed by the unreinforced surfaces of corresponding thermoplastic materials. This is because fibers from at least one of the surfaces are caused to penetrate both into the weld and into the other surface. This provides added, unexpected tensile strength to the weld.

DESCRIPTION OF THE INVENTION

The invention provides a method of attaching a first surface comprising a fiber reinforced first thermoplastic composition to a second surface comprising a second thermoplastic composition which method comprises contacting the first and second surfaces and vibration welding the contacted first and second surfaces under conditions sufficient to form a weld between the first and second surfaces which weld comprises a blend of the first and second thermoplastic compositions and wherein fibers from the first surface penetrate both into weld and the second surface.

The invention also provides a vibration welded article which comprises a first surface comprising a fiber reinforced first thermoplastic composition, and a second surface comprising a second thermoplastic composition in contact with the first surface, and a weld between the first and second surfaces comprising a blend of the first and second thermoplastic compositions and wherein fibers from the first surface penetrate both into the weld and the second surface.

Techniques of vibration welding and apparatus for conducting vibration welding are well known in the art as exemplified by U.S. Pat. No. 4,844,320 which is incorporated herein by reference. There are four phases to vibration welding of thermoplastics, namely heating of the interface by friction; unsteady melting and flow of material in the lateral direction; melt zone establishment at a steady state condition; and unsteady flow and solidification of the materials at the weld zone upon cessation of vibration. Welding may be conducted by standard vibration welding equipment which have been modified to achieve the parameter conditions required for the invention. The parameters of significance include pressure, amplitude, frequency, weld cycle time and hold time.

Vibration welders are commercially available from Branson Ultrasonics Corporation, Danbury, Conn., as a Mini-Vibration Welder and 90 series Vibration Welders model VW/6. However, these must be adjusted since their rated amplitude range is 0.040 to 0.070 inches at 240 Hz output frequency. Vibration welding may be conducted by placing a first thermoplastic surface and a second thermoplastic surface into contact under pressure. At least one and preferably both of the thermoplastic surfaces are fiber reinforced. The surfaces to be welded are placed into contact with one another and the interface between the surfaces is kept at a predetermined pressure, for example by positioning them on a platform under pressure applied by air or hydraulic cylinders. Linear reciprocating motion is then imparted to one surface with respect to the other surface to create a frictional rubbing which generates heat, melts the surfaces and blends the thermoplastic materials from the first and second surfaces. Prior to welding, the fibers in the fiber reinforced thermoplastic materials are substantially unoriented. In prior art vibration welding techniques, thermoplastic surfaces in contact melt and blend to form a weld, however, fibers positioned in the weld are only oriented within the plane of the weld. In contrast, when vibration welding is conducted according to this invention, fibers which reinforce the surface or surfaces are pressed into the opposite contacting surface. This achieves a heretofore unattainable weld strength when the weld cools.

According to the invention, the two thermoplastic surfaces which may be welded are composed of any compatible thermoplastic polymeric material. Suitable thermoplastic polymers nonexclusively include polyamides, polyesters, polycarbonates, polysulfones, polyimides, polyurethanes, polyethers, vinyl polymers, and mixtures thereof Polyamides such as nylon 6 and nylon 66, for example Capron® 8233G HS nylon 6 and Capron® 5233G HS nylon 66 available from AlliedSignal Inc. of Morristown N.J. and polyesters such as Petra® 130 polyethylene terephthalate available from AlliedSignal Inc. are most preferred. Dissimilar thermoplastic surface materials may be used provided they blend compatibly. At least one and preferably both of the thermoplastic surfaces are fiber reinforced. Suitable reinforcing fibers non-exclusively include materials which do not soften, i.e. lose their rigidity, at temperatures typically used for injection molding, such as temperatures of up to about 400° C. Preferably the fiber reinforcement comprises such a material as glass, carbon, silicon, metals, minerals, polymeric fibers and mixtures thereof Glass fiber reinforcement is most preferred. In the preferred embodiment, the fiber is rigid and has a diameter of from about 8 to about 12 micrometers, preferably from about 9 to about 11 micrometers and most preferably about 10 micrometers. The preferred fiber length is from about 120 to about 300 micrometers, more preferably from about 130 to about 250 micrometers and most preferably from about 140 to about 200 micrometers. In the preferred embodiment, the fibers comprises from about 6 to about 40 weight percent of the thermoplastic composition, more preferably from about 13 to about 25 weight percent of the thermoplastic composition.

The linear peak-to-peak displacement or distance of rub of one surface on the other is the vibration amplitude. In the preferred embodiment, the vibration amplitude is at least about 0.075. More preferably the vibration amplitude ranges from about 0.075 to about 0.15 inch and most preferably from about 0.075 to about 0.090 inch. The foregoing amplitudes are at a nominal output vibration frequency of 240 Hz. At other vibration frequencies the amplitude would vary. For example, at a nominal output vibration frequency of 120 Hz, the preferred vibration amplitude would range from at least about 0.09 inch, more preferably from about 0.13 inch to about 0.16 inch and most preferably from about 0.135 inch to about 0.145 inch. Vibration amplitudes for other frequencies can be easily determined by those skilled in the art.

In the preferred embodiment, the contacting surfaces are held under a pressure, normal to the surfaces, of from about 0.6 to about 1.5 MPa during vibration welding. More preferably the pressure ranges from about 0.6 to about 1.2 MPa and most preferably from about 0.7 to about 0.8 MPa. The time of oscillation or rubbing time preferably ranges from about 2 to about 7 seconds, more preferably from about 4 to about 6 seconds. The hold time, or cooling time during which the pressure is maintained after stopping oscillations preferably ranges from about 2 to about 8 seconds, more preferably from about 4 to about 5 seconds. The weld thickness preferably ranges from about 160 to about 400 micrometers, more preferably from about 200 to about 350 micrometers and most preferably from about 250 to about 330 micrometers. When vibration welding is conducted under the foregoing conditions, a portion of the fibers from the reinforced surface penetrate into the weld and the opposite surface. When both surfaces comprise reinforced thermoplastics, a portion of the fibers from each surface penetrate both into the weld and the opposite surface. In the preferred embodiment, the estimated (by tensile strength) proportion of fibers from one or both reinforced surfaces penetrating into the opposite surface ranges from about 2% to about 8% preferably from about 4% to about 8%, and more preferably from about 5% to about 8%. As a result of the vibration welding process of this invention, welds of a reinforced thermoplastic surface to another thermoplastic surface achieve a higher maximum tensile compared to a weld formed by unreinforced surfaces of corresponding thermoplastic materials. The tensile strength of vibration welds of reinforced thermoplastic surfaces range from at least about 85% and preferably from about 85% to about 120% of a weld formed by the unreinforced surfaces of corresponding thermoplastic materials. Without being held to a particular theory, it is hypothesized that the vibration welding parameters of this invention allow fiber penetration from one reinforced surface into the other surface. For example, pressure application, and vibration time and amplitude should be conducive to pushing fibers from one melted surface into the other. Weld thickness which is too low or fiber loading which is too high may result in insufficient space for fiber rotation and hence restrain fiber crossing into the opposite surface.

The following non-limiting examples serve to illustrate the invention. It will be appreciated that variations in proportions and alternatives in elements of the components of the photosensitive coating composition will be apparent to those skilled in the art and are within the scope of the present invention.

EXAMPLE 1

Pellets of Capron® 8233G HS nylon 6 and Capron® 5233G HS nylon 66 available from AlliedSignal Inc. of Morristown N.J. are injection molded into 3"×4"×¼" and 3"×4"×⅛" blocks containing a nominal 0–50 weight % fiberglass reinforcement. Identical blocks are vibration welded together with a Mini-Vibration Welder or 2400 Series Welder from Branson Ultrasonics Corporation using the following parameters: maximum clamp load: 4.5 kN; weld amplitude: 0.762 to 2.28 mm (0.030" to 0.090"); weld time: 4–8 seconds, nominal weld frequency: 240 Hz. Welding parameters, i.e. pressure (loading), amplitude and time were varied to optimize tensile strength of the welded joints. Only those samples which achieved a tensile strength higher than that of the base unfilled materials were selected to then study morphology of the weld zones. Details of the zone interface and fiber orientation were included in this analysis. Optical microscopy was used to study the morphology of the samples, while image analysis was used to quantify fiber length.

Analysis of Glass Fibers Loading at Weld Zone

The nominal fiber loading of the Capron® nylon 6 injection molded parts that were studied ranged from 0 to 50 weight %. However, the actual fiber loading at the weld zone may vary if either fibers or the nylon matrix are preferably pushed away from the weld zone as the joint is formed. In order to determine whether the fiber loading in the excess flow region at the weld is different than in the bulk material, the weight % of fibers was measured by taking the weight difference of the excess before and after the matrix was pyrolized. The results of seven Capron® 8233G HS nylon 6 samples processed under different welding conditions are summarized in Table 1. The results show that fiber loading of the various nylon 6 materials examined are approximately 0.5 wt. % to 1 wt. % lower than the bulk composition.

For nylon 66, the glass content in the weld zone flash was measured from Capron® 5233G HS nylon 66 samples. The results are given in Table 2 and show that fiber loading of nylon 66 at the weld zone flash are approximately 0.5 wt. % lower than the bulk composition. These fiber content variations are rather small and are close to the accuracy of the fiber content measurement.

Analysis of Glass Fiber Length at the Weld Zone

In order to determine whether there may be excessive breakage of fiber at the weld zone, an analysis of fiber length was conducted. Fiber length determination of fibers from the flash (recovered from pyrolysis ash) was measured by optical microscopy and by image analysis. Glass fiber samples were drawn from the ash and dispersed onto a glass slide with 2,2,2-trifluoroethanol (TFE) solvent. Ten optical micrographs were taken of each sample and a total of 1000–2000 fibers were digitized and measured by the image analyzer. Table 3 summarizes the results. The analysis indicates that averaged fiber lengths of all samples are within the range of 120 to 180 micrometers. This is comparable to the fiber length average of samples measured from the original molded tensile bars away from the area of the weld zone. Furthermore, a study of the weld zone fracture surface by scanning electron microscopy suggested that there is no excessive breakage of fibers at the weld zone.

Analysis of Glass Fiber Orientation Distribution at the Weld Zone

The Fiber Orientation Distribution (FOD) of glass fibers (GF) at the weld zone was studied by optical and scanning electron microscopy. For each sample, both planar and through thickness sections were prepared and metallographically polished in preparation for optical microscopy study. Optical micrographs at relatively low magnifications (25× and 50×) show the general FOD around the weld zone as well as fiber orientation at the weld zone. Optical micrographs are taken from polished sections of nylon 6 samples with 6 wt. % GF, 14 wt. % GF, 25 wt. % GF, 33 wt. % GF and 50 wt. % GF, respectively. Micrographs show the fiber orientation both close to and away from the weld zone. Additionally the apparent thickness of the weld zone can be measured directly from the FOD changes with position shown in the micrograph. It is noted that for samples with 14 and 25 wt. % GF, there is apparent evidence of some fibers oriented in the tensile direction perpendicular to the weld plane. It was noted that the effects of reinforcement at optimized welding conditions appeared independent of the glass fiber orientation in the molded plaques which were selected for welded.

Tensile Strength of Weld Joints

For each vibration weld condition (i.e. a set pressure, amplitude and weld time), ten specimens were tested under the standard ASTM D638M-93 tensile testing procedure for plastics. Table 4 summarizes the results for weld joint tensile strength at optimized weld parameters. The influence of glass fiber loading on tensile strength is examined. These results indicate that all the weld joint samples have a tensile strength higher than that of unreinforced nylon 6. For the reinforced nylon 6 materials, the maximum tensile strength is 93.1 MPa. This occurs around 14 wt. % to 25 wt. % glass fiber loading. By comparison with the unreinforced material, which has a tensile strength of 79.3 MPa, this highest weld strength found in the reinforced grades represents a 17% increase in weld joint tensile strength.

The tensile strength of welded nylon 6 materials appears to be slightly higher (approx. 4%) than that of welded nylon 66 under the same welding and reinforcing conditions. The data also show that, at the interface, the glass fiber/nylon 66 composition is similar to that of the bulk composite. The observed higher weld strength of the glass filled nylon 6 at optimum welding process conditions may be attributed to several factors. For nylon 6, at some compositions and welding parameter choices, a percentage of the glass fibers appear to cross the weld plane at the interface. The width of the weld zone, which is around 200–300 micrometers, is comparable to the average length of fibers. This may permit some mobility of the fiber to move in directions other than the primary resin flow direction during the weld, i.e., the fibers are not so confined to move along the flow direction as in a narrow weld zone. The weld zone thickness observed from the micrographs may be plotted as a function of fiber loading. It is noted that the weld zone thickness does go through a maximum at 14 wt. % fiber loading. This maximum occurs at the same location (14 wt. % to 25 wt. % glass fiber (GF)) as does the tensile curve maximum. This further suggests that the thickness of weld zone has a positive influence on the tensile strength of the welded joint. By preparing weld specimens at different orientations to the predominant fiber orientation, studies of weld performance as a function of the glass fiber orientation distribution in the GF nylon 6 plaques were permitted. Results of this data suggest that at the welding interface the fiber orientation achieved in the region of the weld zone becomes independent of the predominant orientation of glass fiber in the bulk nylon 6, adjacent to the weld. This data for linear vibration welded polyamide butt joints shows an increase in tensile strength up to 35% in comparison with prior published data.

TABLE 1

Percentage of Glass Fiber in the Flash for Capron ® 8233G HS (nylon 6)

| Sample No. | Wt. % Fiber in the Flash |
|---|---|
| 1 | 32.04 |
| 2 | 32.52 |
| 3 | 32.26 |
| 4 | 32.56 |
| 5 | 32.54 |
| 6 | 32.20 |
| 7 | 31.93 |
| Average | 32.29 ± 0.25 |
| Capron ® 8233G HS Bulk | 33.01 ± 1.21 |

TABLE 2

Percentage of Glass Fiber in the Flash for Capron ® 5233G HS (nylon 66)

| Sample ID | wt. % of glass Fiber in Flash | wt. % of Glass Fiber in Bulk |
|---|---|---|
| 5233 GHS | 33.48 | 33.94 |

TABLE 3

Fiber Length Analysis for Capron ® 8233G HS (nylon 6)

| Sample ID | No. of Fibers | Averaged Length of Fiber (micrometers) |
|---|---|---|
| 1 | 1775 | 124.7 |
| 2 | 1838 | 131.8 |
| 3 | 1106 | 151.9 |
| 4 | 1182 | 147.7 |
| 5 | 1018 | 167.8 |

TABLE 3-continued

Fiber Length Analysis for Capron ® 8233G HS (nylon 6)

| Sample ID | No. of Fibers | Averaged Length of Fiber (micrometers) |
|---|---|---|
| 6 | 1381 | 145.9 |
| 7 | 834 | 180.25 |
| Capron ® 8233G HS Bulk | 1374 | 133.7 |

TABLE 4

| wt. % Glass Fiber | Trade Name | Tensile Strength, MPa at Optimized Welding Conditions |
|---|---|---|
| 0 | Capron ® 8202 HS | 79.3 |
| 6 | Capron ® 8230G HS | 83.1 |
| 14 | Capron ® 8231G HS | 90.7 |
| 25 | Capron ® 8232G HS | 90.2 |
| 33 | Capron ® 8233G HS | 85.2 |
| 50 | Capron ® 8235G HS | 80.5 |

What is claimed is:

1. A method of attaching a first surface comprising a fiber reinforced first thermoplastic composition to a second surface comprising a second thermoplastic composition which method comprises pressing together and vibrating the first and second surfaces, thereby melting each of the first and second surfaces and fusing the first and second surfaces together to thereby form a weld between the first and second surfaces which weld comprises a blend of the first and second thermoplastic compositions and wherein fibers from the first surface penetrate both into the weld and the second surface.

2. The method of claim 1 wherein the second thermoplastic composition is fiber reinforced and wherein fibers from the second surface penetrate both into the weld and the first surface.

3. The method of claim 1 wherein each of the first and second thermoplastic compositions comprises a thermoplastic polymer selected from the group consisting of polyamides, polyesters, polycarbonates, polysulfones, polyimides, polyurethanes, polyethers, vinyl polymers, and mixtures thereof.

4. The method of claim 1 wherein the fiber comprises a material which does not soften at temperatures of up to about 400° C.

5. The method of claim 1 wherein the fiber comprises a material selected from the group consisting of glass, carbon, silicon, metals, minerals, polymers and mixtures thereof.

6. The method of claim 2 wherein the fiber reinforcement in the first thermoplastic composition and the fiber reinforcement in the second thermoplastic composition comprise materials which do not soften at temperatures of up to about 400° C.

7. The method of claim 2 wherein the fiber reinforcement in the first thermoplastic composition and the fiber reinforcement in the second thermoplastic composition comprise materials selected from the group consisting of glass, carbon, silicon, metals, minerals, polymers and mixtures is thereof.

8. The method of claim 1 wherein the fiber is present in the reinforced first thermoplastic composition in an amount of from about 6 to about 40 weight percent based on the weight of the first thermoplastic composition.

9. The method of claim 1 wherein fiber is present in both the reinforced first thermoplastic composition and the reinforced second thermoplastic composition in an amount of from about 6 to about 40 weight percent based on the weight of the respective thermoplastic composition.

10. The method of claim 1 wherein vibration welding is conducted at a vibration amplitude of from about 0.075 inch to about 0.15 inch at a nominal frequency of about 240 Hz.

11. The method of claim 1 wherein vibration welding is conducted at a pressure normal to the surfaces of from about 0.6 to about 1.5 MPa.

12. The method of claim 1 wherein vibration welding is conducted at a hold time of from about 2 to about 8 seconds.

13. The method of claim 1 wherein vibration welding is conducted at a time of oscillation of from about 2 to about 7 seconds.

14. The method of claim 1 wherein the weld has a thickness of from about 160 micrometers to about 400 micrometers.

15. The method of claim 1 wherein the second thermoplastic composition is fiber reinforced and wherein fibers from the second surface penetrate both into the weld and the first surface; wherein each of the first and second thermoplastic compositions comprises a thermoplastic polymer selected from the group consisting of polyamides, polyesters, polycarbonates, polysulfones, polyimides, polyurethanes, polyethers, vinyl polymers, and mixtures thereof; wherein the fiber reinforcement in both the first thermoplastic composition and the second thermoplastic composition comprise a material selected from the group consisting of glass, carbon, silicon, metals, minerals, polymers and mixtures thereof, wherein the fiber does not soften at temperatures of up to about 400° C.; wherein the fiber present in the reinforced first thermoplastic composition and the reinforced second thermoplastic composition is present in an amount of from about 6 to about 40 weight percent based on the weight of the respective thermoplastic compositions and wherein the weld has a thickness of from about 160 micrometers to about 400 micrometers.

16. The method of claim 15 wherein each of the first and second thermoplastic compositions comprise a polyamide and wherein the fibers in each of the first and second thermoplastic compositions comprise glass.

17. The method of claim 16 wherein vibration welding is conducted at a vibration amplitude of from about 0.075 inch to about 0.15 inch at a nominal frequency of about 240 Hz; wherein vibration welding is conducted at a pressure normal to the surfaces of from about 0.6 to about 1.5 MPa; wherein vibration welding is conducted at a hold time of from about 2 to about 8 seconds; wherein vibration welding is conducted at a time of oscillation of from about 2 to about 7 seconds.

18. A vibration welded article produced by a method which comprises pressing together and vibrating a first surface comprising a fiber reinforced first thermoplastic composition, and a second surface comprising a second thermoplastic composition in contact with the first surface, and thereby melting each of the first and second surfaces and fusing the first and second surfaces together to thereby form a weld between the first and second surfaces comprising a blend of the first and second thermoplastic compositions and wherein fibers from the first surface penetrate both into the weld and the second surface.

19. The article of claim 18 wherein the second thermoplastic composition is fiber reinforced and wherein fibers from the second surface penetrate both into the weld and the first surface.

20. The article of claim 18 wherein each of the first and second thermoplastic compositions comprises a thermoplastic polymer selected from the group consisting of polyamides, polyesters, polycarbonates, polysulfones, polyimides, polyurethanes, polyethers, vinyl polymers, and mixtures thereof.

21. The article of claim 18 wherein the fiber comprises a material which does not soften at temperatures of up to about 400° C.

22. The article of claim 18 wherein the fiber comprises a material selected from the group consisting of glass, carbon, silicon, metals, minerals, polymers and mixtures thereof.

23. The article of claim 19 wherein the fiber reinforcement in the first thermoplastic composition and the fiber reinforcement in the second thermoplastic composition comprise materials which do not soften at temperatures of up to about 400° C.

24. The article of claim 19 wherein the fiber reinforcement in the first thermoplastic composition and the fiber reinforcement in the second thermoplastic composition comprise materials selected from the group consisting of glass, carbon, silicon, metals, minerals, polymers and mixtures thereof.

25. The article of claim 18 wherein the fiber is present in the reinforced first thermoplastic composition in an amount of from about 6 to about 40 weight percent based on the weight of the first thermoplastic composition.

26. The article of claim 18 wherein fiber is present in both the reinforced first thermoplastic composition and the reinforced second thermoplastic composition in an amount of from about 6 to about 40 weight percent based on the weight of the first thermoplastic composition.

27. The article of claim 18 wherein the weld has a thickness of from about 160 micrometers to about 400 micrometers.

28. The article of claim 18 wherein the second thermoplastic composition isfiber reinforced and wherein fibers from the second surface penetrate both into the weld and the first surface; wherein each of the first and second thermoplastic compositions comprises a thermoplastic polymer selected from the group consisting of polyamides, polyesters, polycarbonates, polysulfones, polyimides, polyurethanes, polyethers, vinyl polymers, and mixtures thereof, wherein the fiber reinforcement in both the first thermoplastic composition and the second thermoplastic composition comprise a material selected from the group consisting of glass, carbon, silicon, metals, minerals, polymers and mixtures thereof, wherein the fiber does not soften at temperatures of up to about 400° C.; wherein the fiber present in the reinforced first thermoplastic composition and the reinforced second thermoplastic composition is present in an amount of from about 6 to about 40 weight percent based on the weight of the respective thermoplastic compositions and wherein the weld has a thickness of from about 160 micrometers to about 400 micrometers.

29. The article of claim 28 wherein each of the first and second thermoplastic compositions comprise a polyamide and wherein the fibers in each of the first and second thermoplastic compositions comprise glass.

* * * * *